Dec. 28, 1954    A. E. COMSTOCK    2,697,918
ICE DISPENSING APPARATUS
Filed Nov. 16, 1949    4 Sheets-Sheet 1

INVENTOR.
Alfred E. Comstock
BY
Cromwell, Greist + Warden
ATTORNEYS

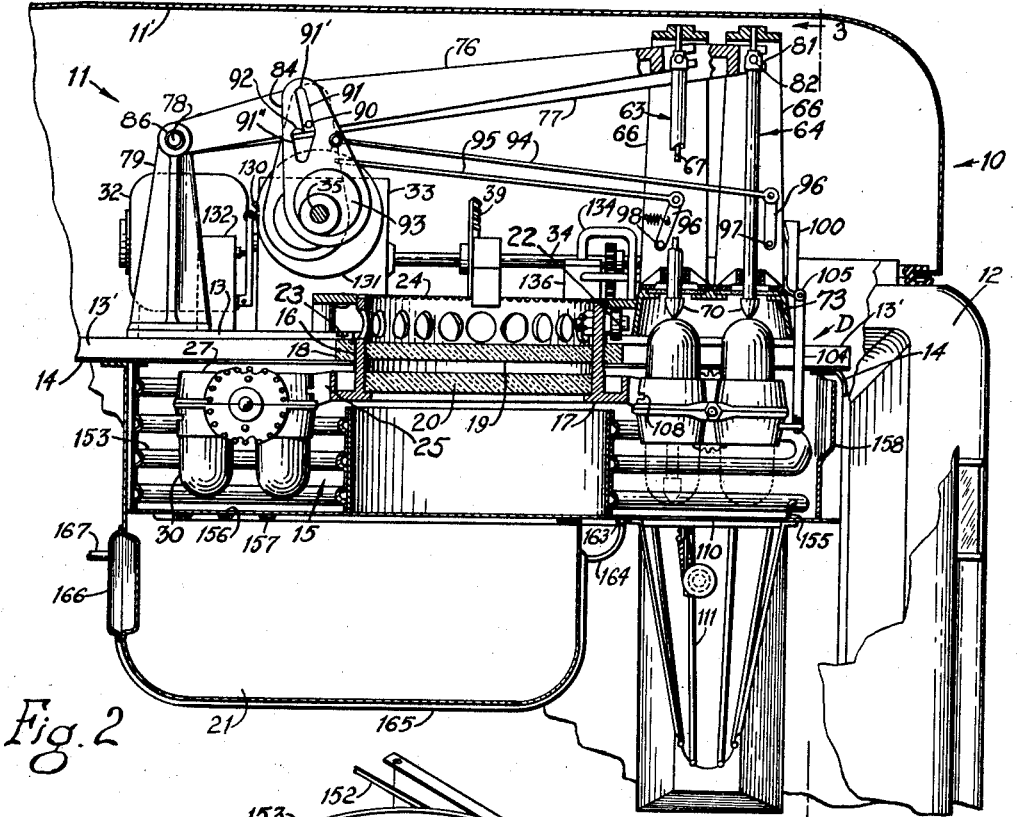
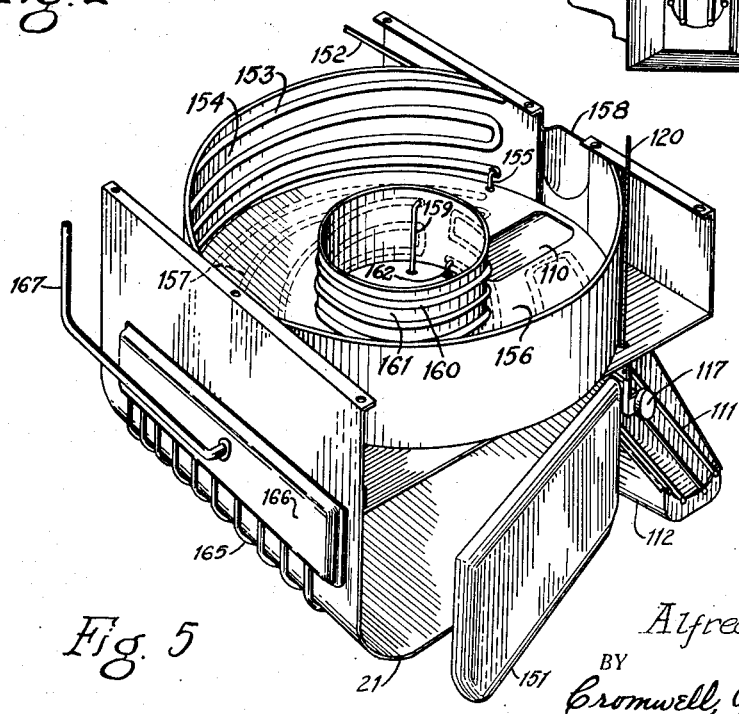
Fig. 2
Fig. 5
INVENTOR.
Alfred E. Comstock
BY Cromwell, Greist & Warden
ATTORNEYS Dec. 28, 1954 A. E. COMSTOCK 2,697,918
ICE DISPENSING APPARATUS
Filed Nov. 16, 1949 4 Sheets-Sheet 3
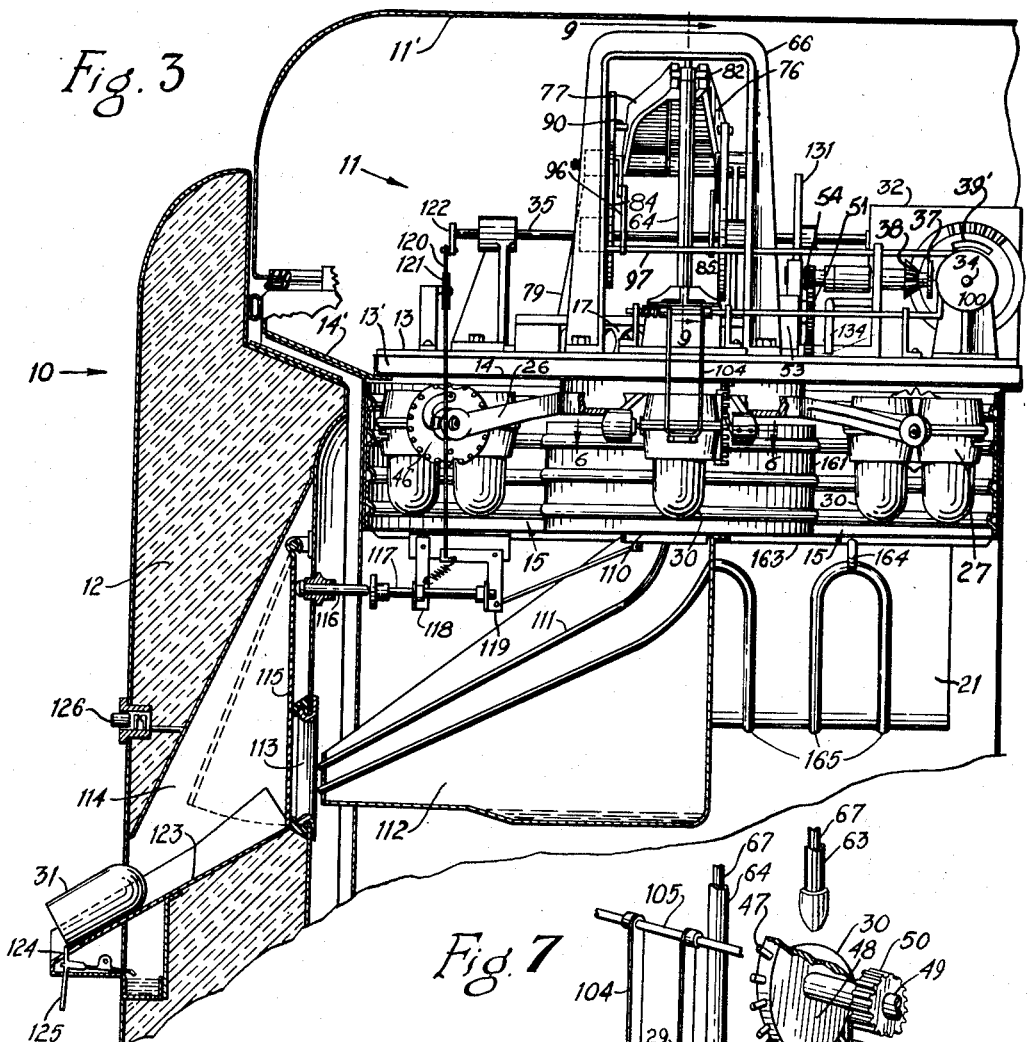
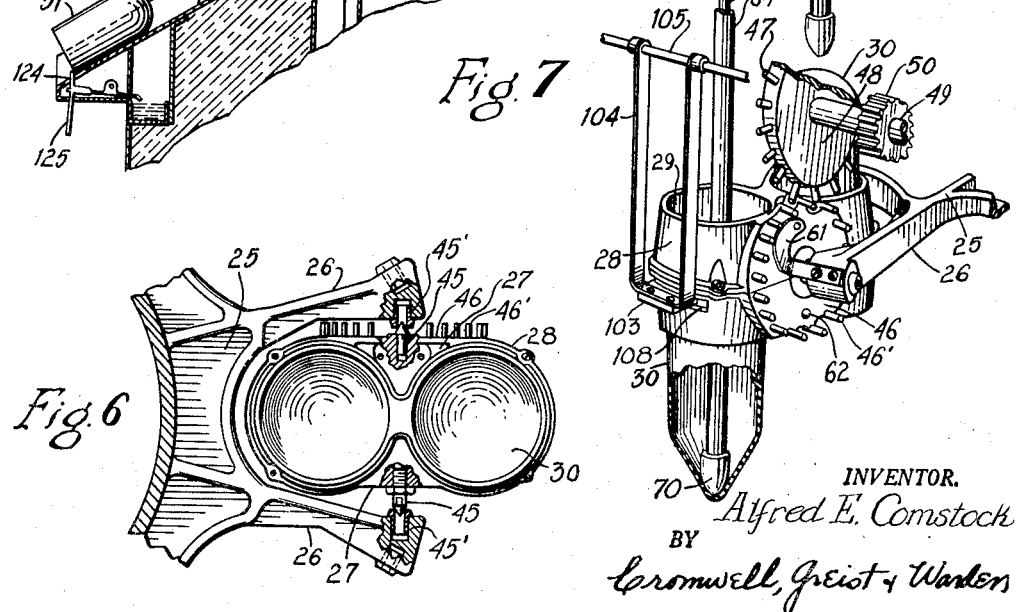
INVENTOR.
Alfred E. Comstock
BY
Cromwell, Greist & Warden
ATTORNEYS Dec. 28, 1954  A. E. COMSTOCK  2,697,918
ICE DISPENSING APPARATUS
Filed Nov. 16, 1949  4 Sheets-Sheet 4
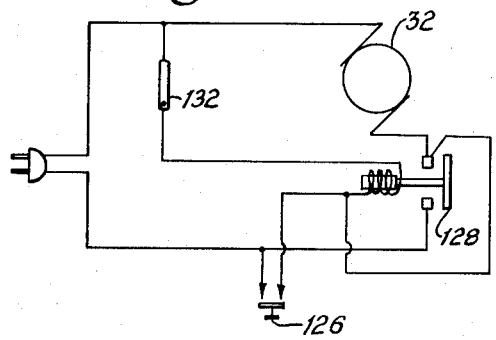
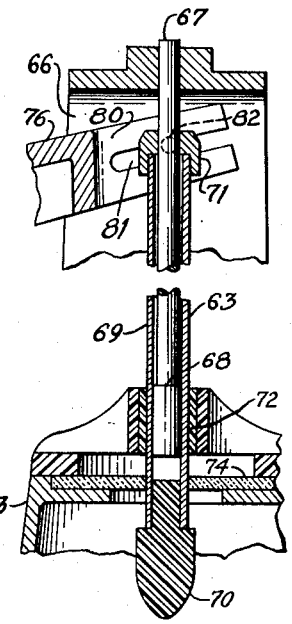
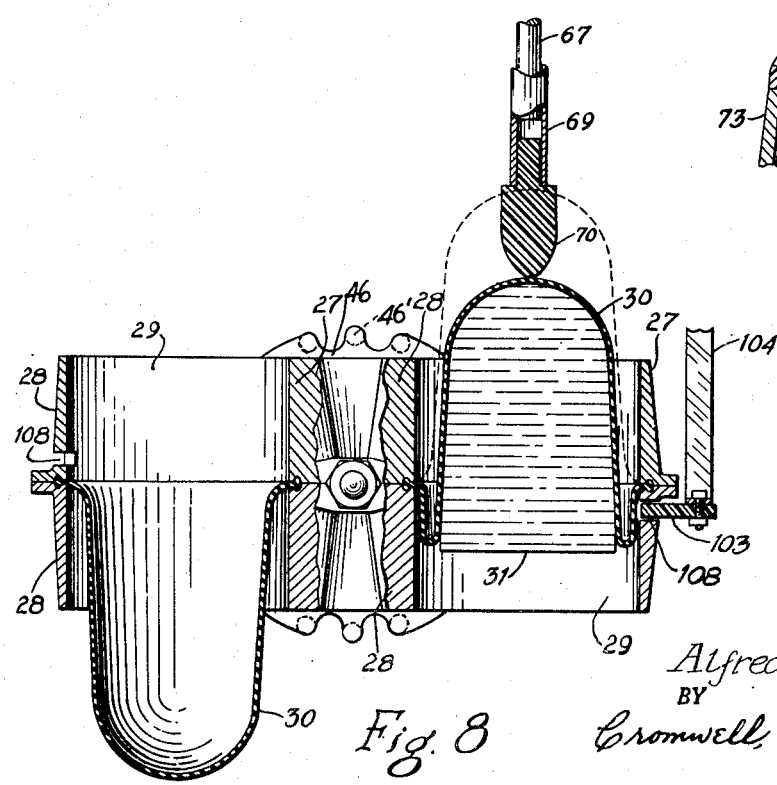
INVENTOR.
Alfred E. Comstock
BY
Cromwell, Greist & Warden
ATTORNEYS

United States Patent Office 2,697,918
Patented Dec. 28, 1954

2,697,918

ICE DISPENSING APPARATUS

Alfred E. Comstock, Palmer, Mass.

Application November 16, 1949, Serial No. 127,747

7 Claims. (Cl. 62—106)

This invention relates to an improved apparatus for dispensing ice in measured quantities, and in particular it relates to an apparatus of that type which is adapted for association with or incorporation in a standard domestic refrigerator.

It is an object of the invention to provide a novel and highly simplified ice dispensing apparatus of the foregoing character involving a relatively few parts which are of simple and comparatively standard design, which apparatus is completely automatic from start to finish of its operation to dispense a measured piece of ice upon manipulation of a control button.

Another object of the invention is to provide an apparatus of the type described including means for successively indexing small, measured, individual charges of water or other substance to be frozen in an endless path through an annular freezing chamber, in traversing which path said cubes are at all times subject to a freezing temperature in said chamber, and for automatically discharging the resultant frozen blocks or cubes at a discharge point in said path.

Yet another object is to provide an apparatus of the type described including a novel enclosed freezing chamber of annular shape having provisions on the sides and bottom thereof for the efficient refrigeration of the annular space therein, in which chamber a series of refillable cups are transported in an annular path, together with reciprocable plunger means extending into said chamber to discharge the congealed contents of said cups, and provisions for preventing heat transfer from the chamber adjacent the plunger means so as to insure continued unfailing operation of the latter, notwithstanding the freezing atmosphere to which a portion of the plunger means is subject.

Another general object is to provide an apparatus of the type described including an annular, well insulated and well refrigerated freezing chamber in association with a refrigerated compartment for the reception and storage of frozen foods and like commodities, along with a common refrigerating system for circulating a refrigerant fluid in heat transfer relation to said chamber and compartment.

A still further object is to provide a cube freezing and dispensing apparatus of the foregoing type wherein a plurality of ice cube cups or receptacles are disposed in their entireties in a freezing chamber maintained at a freezing temperature and are caused to move intermittently in said chamber in an annular or orbital path, in which apparatus a minimum of moving parts are located in the freezing chamber and have special provisions insuring their continued operativeness notwithstanding the freezing atmosphere in which they function.

A still further object is to provide an ice cube dispensing apparatus of the type referred to above, in which the bulk of the actuating and control instrumentalities are housed in a space which is thoroughly insulated from a freezing chamber traversed by the measured charges of freezable substance, thereby insuring unfailing operation and enabling said parts to be fabricated in inexpensive and relatively simple standard designs.

Yet another object is to provide a freezing and dispensing apparatus including an enclosed freezing chamber of novel character adapted for operation in conjunction with the freezing unit of a domestic refrigerator, said chamber being sealed from room atmosphere even when the door of the refrigerator is open and thereby minimizing frosting, and affording an intensified freezing atmosphere for the thorough freezing of measured charges of a liquid substance during a relatively quick traversal in the freezing chamber.

A still further object is to provide an endless annular freezing chamber and a plurality of sets of reversible freezing cups or receptacles which are symmetric or identical in shape regardless of which surface thereof is exposed to receive a charge of liquid substance, said cups being disposed in their entireties in said chamber to traverse an annular path therearound, together with means for periodically inverting said receptacles, for automatically stripping and discharging the contents thereof at a discharge station and for thereafter indexing each set of receptacles to a further station at which they are refilled for subsequent freezing.

A still further object is to provide a freezing and dispensing apparatus of the foregoing type, adapted for operation in conjunction with a domestic refrigerator, including means for delivering the cube-like frozen product of the freezing and dispensing operation to a point externally of the refrigerator structure, whereby it is unnecessary to open the door of the refrigerator for access to said frozen product.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 2 is a fragmentary view in transverse vertical section viewed from the front of the apparatus, further illustrating the construction and mode of operation of the spider-like rotary cup holder, the freezing chamber in which the same transports charges of freezable substance, and the cube discharge instrumentalities of the apparatus;

Fig. 3 is a fragmentary vertical section viewed approximately on line 3—3 of Fig. 2, illustrating still further structure details of the cube discharge mechanism and cube delivery arrangement of the apparatus, as well as certain details of the actuating and control mechanisms of said apparatus;

Fig. 4 is a schematic wiring diagram illustrating the control and operating circuits involved in the automatic operation of the apparatus;

Figure 1:
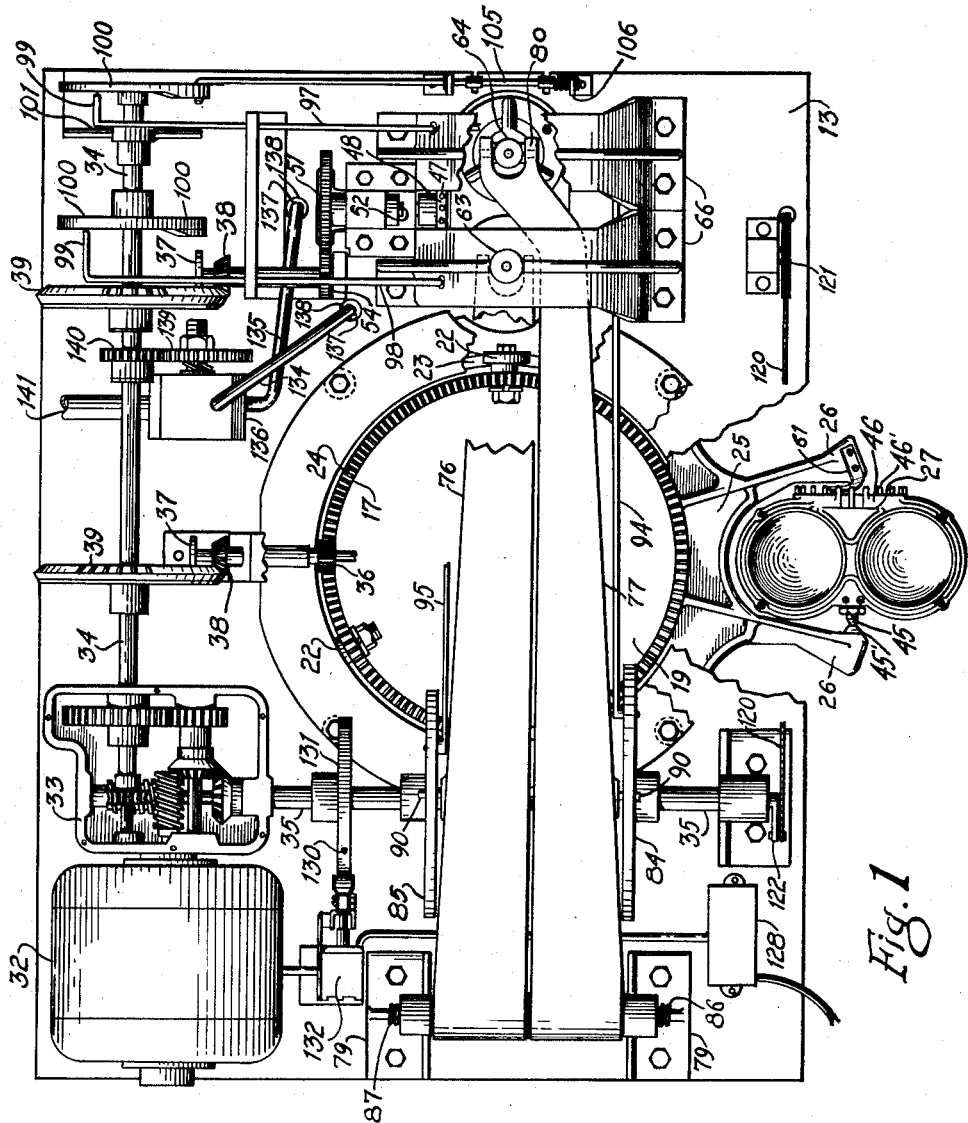
Fig. 1 is a top plan view of the apparatus of the present invention, being partially broken away to reveal and clearly illustrate certain of the details which are housed in the freezing chamber.

Fig. 5 is a perspective view illustrating the novel freezing chamber of the apparatus in which the freezing cups of said apparatus are disposed and through which they are transported during a complete cycle including cup-inverting ice cube discharging, cup refilling and freezing operations, particularly indicating the manner in which said chamber is associated with an ice tray of frozen food compartment of a more or less standard design;

Fig. 6 is an enlarged fragmentary view which is partially broken away and in section for clarity of detail, being taken approximately on line 6—6 of Fig. 3, illustrating the cup supporting means and a portion of the cup inverting means;

Fig. 7 is a fragmentary perspective view showing the cup inverting and locking mechanism and indicating the discharge plungers positioned adjacent the cups for discharging frozen cubes therefrom during the cycle of operation of the apparatus;

Fig. 8 is an enlarged fragmentary view in section through a flexible and distortable ice cube receptacle or cup of the apparatus, illustrating the means for pivoting and locking a cup holder and for discharging the cup contents by stripping from a cup at a cube delivery station, and also illustrating the symmetric character of said cups regardless of which surface thereof is innermost; and Fig. 9 is a fragmentary view in vertical section approximately along line 9—9 of Fig. 3, illustrating certain structural details for guiding and actuating the cube discharge plungers.

This invention affords an improved and simplified apparatus for freezing and dispensing individual charges or cubes of ice or other equivalent frozen substance, said apparatus being particularly well adapted for association with any one of several well known types of domestic refrigerator now on the market. I am aware that various types of apparatus of this general type have been heretofore proposed; however, certain practical objections in the construction and operation thereof have prevented their wide acceptance and use.

For example, a lack of adequate insulation of the numerous moving parts involved in the operation of previous devices has resulted in the literal freezing and stoppage of said parts, at the bearings or relatively movable surface thereof, under the reduced temperatures and subsequent frosting to which they are necessarily exposed. Many moving parts are disposed in a refrigerated, subfreezing atmosphere under conditions ideal to the formation of ice or frost on said parts.

Likewise, in certain known designs employing flexible or distortable freezing cups from which the frozen cubes are discharged, no provision is made to restore the cups to a position to receive a subsequent recharge of material to be frozen, following discharge of the frozen contents. Furthermore, the frozen cube is usually discharged at a point internally of the refrigerator enclosure, requiring opening of the door of the refrigerator for access to the frozen product, with consequent loss of thermal efficiency of the refrigerator.

In general, present mechanisms of the type herein contemplated, which are at all suited for use in conjunction with a domestic refrigerator, are uniformly characterized by a considerable complexity of construction and by a multiplicity of operating parts in the freezing area. None affords fully automatic operation and none is proof against failure of operation under the actual conditions which they encounter.

Referring to the drawings, the reference numeral 10 generally designates a standard, well insulated domestic refrigerator of any one of several types available on the market, within which the freezing and dispensing unit, generally designated 11, of the present apparatus is mounted and totally enclosed.

Unit 11 is positioned in the top of the refrigerator enclosure, the upper panel or dome 11' of said refrigerator being shaped to afford adequate head room in this zone. An insulated door for the refrigerator is designated 12. Referring to Figs. 1, 2 and 3, the freezing and dispensing unit 11 is supported on a horizontal, rectangular sheet metal base 13 of appropriate rigidity and strength, which in turn rests on a sheet 13' of rigid insulating material, fibrous or otherwise. Insulating sheet 13' rests on a porcelain liner panel 14 which extends across the refrigerator interior in substantially spaced relation below the top panel 11', resting on a ledge or flange 14' in the refrigerator interior. This ledge may be integral with certain other structure (not shown) disposed internally of the refrigerator.

Accordingly, the refrigerated base described above serves to insulate the space thereabove, in which is disposed the bulk of the hereinafter described operating and control instrumentalities of the apparatus that embody moving parts, from the refrigerated space therebelow, and in a portion of which the freezing chamber 15 of the apparatus and other heat transfer parts of the refrigerating system are located. As illustrated, said freezing chamber is suspended from the inner liner 14 for base 13. Accordingly, the operating and control instrumentalities referred to function efficiently at normal room temperature in the space above insulated base 13, being well insulated from the freezing atmosphere in said last named space. This is an important feature of the invention. As for the relatively few moving parts which travel in chamber 15, to be described, they embody special provisions whereby the refrigerated atmosphere to which they are subjected has no appreciable effect on their operation.

Referring particularly to Figs. 1 and 2, the supporting base 13 is provided with a central circular aperture 16, wherein the circular drum-like spider ring 17 is concentrically mounted for rotation about a vertical axis. An annular felt sealing strip 18 carried on base 13 is disposed around the opening 16 and frictionally engages the external surface of the spider ring 17 so as to thermally seal the latter in its rotation, acting as an insulator against temperature transfer between the freezing chamber 15 and the space above said chamber, i. e., above the base. The spider ring 17 is cored out around its periphery for lightness in weight and to minimize heat conduction in the ring, and is fitted internally with two circular insulating and sealing disks 19, 20 of cork, fiber or other appropriate insulating material. These are separated by a dead air space, also for the purpose of preventing loss of refrigeration from the annular freezing chamber 15. The last named insulating provisions likewise maintain thermal efficiency in the standard compartment 21 previously used for the freezing of ice cubes but rendered available for storage of frozen foods and the like by the present improvements. This compartment is suspended beneath the annular freezing chamber and is refrigerated in conjunction with the refrigeration of chamber 15, as will be explained.

The spider ring 17 is supported and guided in its intended, intermittent, rotary indexing movement by a plurality of radially projecting anti-friction rollers 22 rotatively mounted on ring 17, which rollers engage in an annular track 23 formed on the base 13. Step-by-step rotative motion is imparted to the spider ring by bevel gear teeth 24 on the top ring edge and certain driving and control instrumentalities supported above base 13, to be hereinafter described. The above referred to coring out of the spider ring 17 reduces to a minimum the conduction of heat or cold in said ring; hence, eliminates possibility of objectionable frosting at the gear teeth 24, i. e., frosting to an extent which would interfere with proper driving engagement of said instrumentalities with said gear teeth.

At its lower peripheral edge the ring 17 is provided with a multiplicity of radially extending spider arms 25 which extend into the annular freezing chamber 15. These arms terminate in forked fingers or extensions 26 (see Fig. 1) between which a dual cup or receptacle holder 27 is pivotally supported, there being sufficient clearance between said bifurcated extensions 26 to permit 180 degrees of rotation in a radial plane and resultant reversal of the position of the holder 27, at certain periods in the operation of the apparatus.

As clearly illustrated in Figs. 1, 8 and 9, each holder 27 is composed of a pair of forgings or castings which are shaped and secured together to provide pairs of similar circular sleeve-like cup clamping members 28, having openings 29 which are aligned in a vertical radial plane through ring 17. A flexible cup 30 of the shape shown in Fig. 8 is firmly clamped at its external peripheral lip in each of the pair of openings 29 of each holder 27, between the coacting members 28 of the latter. This method of mounting enables the cups 30 to be conveyed through a 360 degree annular path in the freezing chamber 15, whether in the upright, depending position shown to the left in Fig. 8 or in an inverted, upstanding position for discharging the charge, also as shown in Fig. 8. Sufficient lateral clearance is provided between the cups 30 and the adjacent sides of the respective cup openings 29 to permit ready emptying of the inverted flexible cup by axial distorting and stripping, without interference with the holder members 28 as the cup is shifted from dotted line to the solid line position shown in Fig. 8 during the cube discharging operation. It will be appreciated that lateral interference might damage the cup or impede cube discharge. Cup 30 is identical in shape, whether in a depending, charge-transporting position, as illustrated at the right-hand side of Fig. 8, or in the inverted position for discharge which is shown on the left-hand side of that figure. Further reference will be made to the mechanism for effecting the inversion and discharge operations as the description proceeds, but it should be particularly noted at this time that the spider arms 25 convey the respective sets of two cups 30 throughout a complete 360 degree path in the freezing chamber 15 during all of which path the cups are entirely within the confines of said annular freezing chamber. Rotation of spider 17 to so convey the cups, along with operation of various other actuating and control instrumentalities of the apparatus, are effected by the agency of mechanisms which are most clearly illustrated in Fig. 1 of the drawings, to which reference is now directed.

As illustrated in Fig. 1, the base 13 supports an electric driving motor 32 adjacent a rear corner thereof, the shaft of which is connected to a dual output speed changer 33 of standard design, whose details of construction need therefore not be particularly described. Said speed changer is drivingly connected to a drive and control shaft 34, which extends practically the entire width of the unit across the rear side of the latter, rotating said shaft one-half revolution for each cycle of operation of the present apparatus. Speed changer 33 also drives the eccentric and timer shaft 35, which is arranged at a right angle to shaft 34, at a speed of one full revolution for each cycle of operation of the apparatus.

Spider ring 17 is driven from drive and control shaft 34 through the agency of a bevel pinion 36 meshing with the above described bevel gear teeth 24 on the spider ring. Said pinion 36 is rotated intermittently through 360° by a bevel gear 38 on the same short stub shaft as the pinion. Gear 38 is intermittently rotated 360° by meshing with the teeth on a larger mutilated or segmented gear 39 on shaft 34 (see Figs. 1 and 3). When not rotating, due to the disengagement of associated gear 38 from the teeth of gear 39, the pinion 36 is locked by the sliding engagement of a flat chord-like surface on disk 37, which is secured to the pinion shaft, with the side face of gear 39. As the teeth of gear 39 again come into mesh with those of gear 38, an arcuate slot 39' in the former is presented to and receives the arcuate peripheral edge of disk 37, thereby permitting rotation of said disk along with rotating gear 39. A single rotation of pinion 36 ensues, to index the spider ring 17 and its associated elements, including the sets of invertible cup holders 27 and freezing cups 30 carried thereby, through one angular step. Such indexing step takes place only once during each two cycles of operation of the machine, by reason of the ratios effected in the speed changer 33, as described above.

Said sets of cup holders are successively advanced, by successive indexings of the spider ring once each two cycles, to a discharge and delivery station of the apparatus which is generally designated by the reference character D. At this station each set of cups is first inverted from an upwardly opening position to a downwardly discharging position by rotation through 180° in a radial plane, and the two cubes 31 of each set which have been congealed during intermittent annular travel of the cups 30 in the freezing chamber 15 are discharged in successive cycles from the two cups of the sets, one discharge per operative cycle of the apparatus. In an actual embodiment of the apparatus the inner cup is emptied first. The inverting and cube discharging mechanisms will now be described, particular reference being made to Figs. 1, 6 and 7.

As illustrated in Figs. 6 and 7, the cup holders 27 are pivoted in the bifurcated spider arm extensions 26 by means of opposed needle-type, anti-friction bearings 45 which have linear bearing contact in bearing inserts 45' in said extensions. The negligible bearing engagement thus obtained insures against freezing of the pivots in the frigid atmosphere in chamber 15. The holder 27 is provided on one side thereof with a cog disk 46 having a circular series of cog teeth or projections 46' extending from one side thereof which are coaxial with the bearings 45. As illustrated in Fig. 7, these teeth are meshingly arranged with the radially extending teeth 47 of a cog wheel 48 affixed to a horizontal stub shaft 49, which is appropriately journaled on the base 13. It will be noted that the cog driving arrangement is self-cleaning, eliminating the possibility of clogging with frost particles in the frigid atmosphere of the chamber 15. At the end of shaft 49 opposite cog wheel 48 said shaft carries a pinion 50 meshing with an actuating gear 51 on a stub shaft 52. Shaft 52 is rotatably mounted in a bearing 53 immediately above said pinion 50. Gear 51 in turn meshes with a gear 54 on a shaft, to which is attached a segmented gear and locking disk identical to the gear and disk 38, 37, and similarly controlled by a segmented gear 39. Hence, like reference numerals are employed. Accordingly, gears 38 and 54 are positively controlled in their intermittent rotation, being positively held against rotation in the intervening periods.

The proportioning of meshing gears 51, 54 is such that the former makes one-half revolution to a full rotation of the latter. Gear 54 makes a single complete revolution when it is driven by segmented gears 38, 39, and, since shaft 34 makes one-half revolution during each operating cycle of the apparatus, and since cog wheel 48 has a 1:1 operating relation to the cog teeth on the cup holder 27, it is evident that the latter is inverted by rotation of 180° in a radial plane once for each two cycles. The sliding engagement of the locking disk 37 with gear 39 serves to hold the cog wheel 48 against angular movement until properly engaged by the teeth on a succeeding cup holder. A leaf spring locating detent 61 engages with a predeterminedly located projection 62 on the cog disk to insure that the cog teeth 46' are unfailingly engaged properly by cog wheel 48 upon arrival at the discharge station D. Accordingly, assuming that the cup holder is present at discharge station D, with both of the cups 30 thereof in a depending position containing a frozen charge or cube 31, the apparatus is so timed that rotation of shaft 34 immediately inverts the aforesaid cups 30 prior to discharge of the contents thereof by the mechanisms now described.

Referring to Figs. 1, 2, 3, 7 and 8, it will be noted that the cog disks 46 are specially shaped by relieving or cutting away the periphery thereof at diametrically opposed points. This is for the purpose of affording clearance for the depending cogs 47 of wheel 48 when the spider approaches or leaves the discharge station.

Referring to Figs. 1, 2 and 9, the reference numerals 63 and 64 designate a pair of discharge plunger devices which are arranged at spaced, inner and outer respective positions in the radial plane through the discharge station D. Said devices function successively to discharge cubes 31 from the two cups 30 at said station, one plunger device coming into operation during each cycle of operation of the apparatus, as controlled in the manner hereinafter described.

The provisions for vertically guiding the individual plungers 65 of devices 63 and 64 are worthy of note, particular reference being had to Fig. 9 in conjunction with Fig. 2. Individual guide means are provided for each of said devices in the form of inverted U-shaped brackets 66 bolted to base 13. Centrally thereof, each of the brackets carries a fixed depending rod 67 having an enlarged cylindrical guide head 68 of insulating material at its lower end which slidably and internally guides the elongated plunger tube 69. At its lower end said tube is provided with a discharging and guiding plunger tip 70 engageable with the inverted ice cup 30 (see Fig. 8). At its upper end the tube is threadedly fitted with a guide ring or cap 71 which slidably engages rod 67.

In the interest of further stability, the vertically reciprocable tube 69 is additionally guided externally in the guide bushing 72 which is secured to the top of a supplemental housing member 73 on the freezing chamber 15 (see Fig. 2). Bushing 72 is of fibrous and non-conducting material, so that in conjunction with the non-conducting guide head 68 it affords a guide for the plunger that will not frost and thus interfere with the plunger operation. Metal-to-metal contact is eliminated at the guide surface.

The supplemental housing member referred to merely increases the head room of the freezing chamber at the discharge station D, the only point in the path of travel of the cup holders 27 and cups 30 at which they are in the inverted position which requires additional head room. Sealing means 74 at the guide bushing 72 engage the plunger tube and prevent loss of cold air at station D.

Vertical reciprocation of the plunger devices 63, 64 is effected by the eccentric-controlled oscillating arms 76, 77, respectively, which are pivoted at one end of the unit on a horizontal shaft 78 carried by spaced upstanding brackets 79 on the base of the unit. At their opposite ends said arms are forked at 80 and provided with slots 81 which receive the opposite ends of the projecting actuating pins 82 on the plunger tube guide caps 71. The arms 76, 77 are positively actuated in a downward direction by the alternately operable eccentric linkages 84, 85 to discharge the cubes 31 from cups 30 in the fashion illustrated in Fig. 8. This occurs after inversion of the cup holders and latching of the same in fixed position against further rotation in their radial plane of inversion. The arms 76, 77 are restored vertically upwardly by the respective torsion springs 86, 87 surrounding shaft 78 on the front-to-rear eccentric and timing shaft 35, as illustrated in Figs. 1 and 2. As explained above, the shaft 35 makes one revolution for each cube discharge cycle of the apparatus. Accordingly, following inversion of the cup holder at station D, the eccentric 85 controlling the inner plunger device 63 operates to depress that device and bring plunger tip 70 into engagement with one of the inner cups 30, thereby to discharge its frozen contents 31, the spring 87 thereafter restoring the oscillating arm 76 to the raised position shown in Fig. 2.

In the arrangement shown, the eccentrics 84, 85 are arranged in 120° angular spaced relation on shaft 35. Timing means are provided to insure discharge actuation of but one of the devices 63, 64 in each cycle. A mechanism for this purpose is illustrated in Figs. 1, 2 and 3.

Each of the oscillatory arms 76, 77 carries a laterally and outwardly extending lug 90, which lugs project into specially shaped slots 91 in the respective eccentric linkages 84, 85 disposed adjacent said respective oscillatory arms. Said pins 90 are adapted to be selectively positioned either in an upper extension 91' of the slot 91 (as illustrated in Fig. 2), in which downward shifting movement of the cam linkages 84, 85 will be ineffective to impart corresponding movement to the respective arms 76, 77, or to be positioned in a lower lateral bay 91" of said slot, for engagement by the hooked extremity 92 of the bay so as to positively actuate the arm downwardly upon downward shifting of the respective eccentric linkage. Said linkages are actuated in a well known manner by the eccentrics 93 fixed on shaft 35.

The respective linkages 84, 85 are pivotally manipulated to control the positioning of their respective slots 91 relative to the pins 90 on arms 76, 77 by the respective control rods 94, 95. These latter are pivoted at one end on the linkages and at their opposite end are pivoted on rocker arms 96 affixed to the respective control rock shafts 97, 98 journaled in the brackets 66. Rock shafts 97, 98 terminate in laterally directed fingers 99 adapted to be periodically engaged and oscillated, in opposition to suitable return spring means, by the face cam disk 100 on the shaft 34. Accordingly, the cam actuation of the fingers 99 on respective rock shafts 97, 98 determines the angular positioning of the respective eccentric linkages 84, 85. This is effected in such manner that the respective oscillatory arms 76, 77 are alternately drawn downwardly by engagement of the laterally projecting lug 90 thereof in the bay 91" of the slot 91, and are spring held in elevated position due to the positioning of said lugs in the upper lost motion extension 91' of said slot. The timing of oscillation of arms 76, 77 is hereinafter discussed in greater detail.

Successful discharge of the contents of the cups of a given holder 27 at discharge station D is facilitated by the provision of means for periodically engaging said holder during the discharge step and preventing its rotation, under the force of discharge, about its pivots 45. These provisions are illustrated in Figs. 1, 2, 3, 7 and 8, and include a fiber detent dog 103 (see Fig. 7) affixed to the lower end of the stirrup-shaped arm 104. Arm 104 is secured to a rod-like rock shaft 105 journaled in small spaced brackets 106 on the base of the unit. A coil torsion spring 107 surrounding said rock shaft and coacting with one of the brackets 106 normally acts to urge the supporting arms 104 in a direction to engage the dog 103 in a detent slot 108 which is provided in each cup holder 27. Rocking movement of shaft 105 in the opposite, holder-disengaging direction is effected by engagement of a cam member on the disk 100 with an offset lug 110 on said rock shaft 105 (see Figs. 2 and 3). Said cam is so positioned that it causes dog 103 to engage and steady the cup holder on the alternate cycles during the period of discharge of the respective cup contents.

Assuming a pair of cups are positioned at station D at the outset of the cycle of operations of the apparatus, after having traversed the major portion of chamber 15, upon initiation of operation of the apparatus in the manner to be described, the cup holder is first caused to rotate through 180° in its radial plane of pivoting and the dog 103 is brought into latching engagement with the slot 108 in the holder. The plunger discharge device 63 which operates on the inner cup, is then caused to descend until its discharge tip 70 engages the inner cup and ejects its contents. This discharge tip has a rounded conical lower extremity for most effective ejection of the cube from its cup. The ejected cube falls through a discharge opening 110 in the floor of the freezing chamber and onto a wire discharge trough 111 by which it is delivered to the user. Trough 111 is removably positioned in a liquid collecting or drip compartment 12 adjacent and beneath the opening 110 in the freezing chamber so that it may be readily taken out for cleaning.

Referring to Fig. 3, the discharge trough is inclined downwardly and forwardly through liquid collecting compartment 112 and terminates at its outer end in a spout which is aligned with a discharge port 113 in the inner side of the door 12. Said door is recessed at 114 adjacent said port to accommodate a pivoted closure flap 115 normally closing said port, said flap being swingable about its pivot from the solid to the dotted line position of Fig. 3 by the automatic means shown in that figure and also shown in Fig. 1.

The means referred to above consist of a plunger rod 116 guided for horizontal sliding movement in the inner wall of door 12 and adapted to be actuated outwardly by a tappet 117 carried by a swinging support. This support comprises an arm 118 and a bell crank 119, each pivoted on a fixed bracket, said tappet being mounted on the lower ends of the arm and bell crank whereby swinging movement of the same projects the tappet in a horizontal plane. An arm of said bell crank 119 has secured thereto a flexible actuating cable 120 which extends upwardly through an opening in the floor of the freezing chamber 15 and through an aligned opening in the base 13 to pass over an idler pulley 121 carried by said base. As illustrated in Figs. 1 and 3, the other end of cable 120 is affixed to a crank 122 on the end of eccentric timing shaft 35. Accordingly, on each cycle of operation the cable 120 is tensioned to oscillate bell crank 119 and shift plunger 116 outwardly to open the discharge flap 115 in the manner illustrated in dotted line in Fig. 3.

The ice cube 31 being discharged passes downwardly through port 113 and over a sheet metal slide 123 into engagement with a spring urged stop 124 adjacent the outer lip of the slide. Said stop 124 carries a lower extension arm or plate 125 which is adapted to be engaged by a suitable receptacle to deflect the stop 124 downwardly and thereby allow the cube 31 to fall into said receptacle.

A manually actuable switch 126 mounted in front of the refrigerator door, as illustrated in Fig. 3, is employed to energize the motor holding relay 128 (see Fig. 1) for initiation of operation of the apparatus, although it is also contemplated that this may also be accomplished by suitably controlling a suitable switch from the movement of the member 125, said last named switch being electrically connected with the motor holding relay 128. Reference may be had to the wiring diagram in Fig. 4 in connection with these features. Said relay is operatively connected with motor 32 in the fashion illustrated in Fig. 4. Following completion of energization of the motor, it operates until the cam and timing shaft 35 has made a single revolution. At such time a circuit breaker pin or cam 130 carried by a disk 131 on shaft 35 comes into engagement with the circuit breaker assembly generally designated by the reference numeral 132 in Figs. 1 and 10 to interrupt the motor circuit. In accordance with the timing of shaft 35, this occurs once per cycle, following inversion of a cup holder, downward movement of the inner plunger device 63 and restoration thereof to raised position, insofar as the inner cup is concerned. This completes a cycle for the first acting plunger device 63 and the circuit breaker cam 130 terminates motor operation immediately thereafter.

The succeeding cycle involves re-energization of the motor circuit, with the actuation of the outer plunger device 64 as its first step. Upon restoration of the plunger device 64, next and final step in the cycle involving the second emptied cup 30 is the indexing of the spider ring 17 which, as has been pointed out above, is timed to occur once every two complete cycles.

Indexing of the spider arm 25 just leaving discharge station D brings the same into register with the succeeding, cup filling station, at which the cups, which are in upwardly opening position ready for filling, are supplied with water or other substance to be frozen. For this purpose supply pipes 134, 135 are provided which lead from a two-way automatic control valve 136 (see Fig. 1) and terminate in down-turned discharge spouts 137. Spouts 137 discharge through openings 138 in base 13 into the respective empty inner and outer cups at the filling station. The automatic valve 136 is of a standard type, governed by a gear 139 which meshes with a pinion 140 on the driving and control shaft 34. Valve 136 is supplied from an inlet pipe 141 and operates to discharge the liquid to cups at the filling station. Gear 139 has twice as many teeth as pinion 140 so that the valve is actuated to open and close the same once every other cycle.

With the cups filled to an appropriate level, which filling occurs while the cups remain, as always, in the freezing chamber 15, the next indexing of the spider ring 17 continues the annular step-by-step travel of the cups through said freezing chamber wherein their contents are congealed prior to again reaching discharge station D.

The invention provides an improved, annular freezing chamber 15 in which the cups are transported. Fig. 5 shows this refrigerating structure in association with the refrigerated frozen food storage compartment 21, which is provided with a pivoted closure 151. Cooling of the freezing chamber 15 and compartment 21 are accomplished in an entirely novel manner, the system associated with said structure by which the refrigerant fluid is circulated around the chamber 15 and compartment 21 being illustrated in Fig. 5 and also in Figs. 2 and 3. Referring to Fig. 5, the intake line for said fluid to the parts to be cooled is indicated by the reference numeral 152, said line communicating with a zigzag conduit 153 which is formed in the upstanding circular wall 154 of freezing chamber 15 by any conventional fabrication procedure. The conduit 153 travels around the periphery of wall 154 at several vertically spaced levels in the zigzag manner shown in Fig. 5, whereby practically the entire inner wall surface is constituted an absorption cooling surface. The wall conduit discharges at one end into a vertical pipe 155 extending through the floor 156 of the freezing chamber into a spiral conduit 157 of zigzag character formed in said floor in the manner that the zigzag conduit 153 is formed in wall 154, said conduit being arranged in the floor whereby the cube discharge opening 110 in the latter is accommodated. Similarly, the zigzag conduit 153 is arranged in the outer wall of the compartment to permit the formation therein of an opening 158 furnishing swinging clearance for the inversion of the cup holder 27.

After traversing substantially the entire floor area, the innermost end of conduit 157 discharges upwardly through a tube 159 into the uppermost level of a further zigzag conduit 160, which is formed in the inner wall 161 of the annular chamber. Conduit 160 traverses practically the entire area of wall 161, much in the manner of conduits 153 and 157, and discharges at its opposite end through a pipe 162 through the central area of the floor of the freezing chamber internally of wall 161. Referring to Figs. 2 and 3, the pipe 162 is adapted to supply a feeder header 163 running along one side of the compartment 21. There are a plurality of feeder tubes 164 which are supplied from the header 163. Each feeder tube 164 discharges into branch distributing conduits 165 formed in the wall of the compartment 21 and extending around the lower surface thereof, said distributor conduits discharging into a refrigerant discharge manifold 166 on the opposite side of compartment 21 from the supply header 163. The refrigerant is returned to the conventional refrigerating unit through a return line 167, in the manner shown in Figs. 2 and 5. Naturally, the top of the freezing chamber 15 is covered by the liner and insulated base member 13, so as to have a minimum tendency to frost in operation.

The above described refrigerating provisions insure an annular freezing chamber which has pronounced thermal efficiency and which is adapted to congeal the contents of the cups 30 at a rapid rate, i. e., well before the latter have traveled from the filling station throughout their annular path to the discharge station D. Yet this atmosphere of pronounced cold is well insulated from the normal room temperature prevailing in the space immediately thereabove, in which the majority of the moving parts operating the apparatus are disposed.

The freezing zone is subject to refrigerating action practically throughout the entire area of the annular, radially spaced wall surfaces and of the floor defining the same, and there is no loss of efficiency in the refrigerating effect due to the necessity of passing the cups 30 or equivalent elements into and out of said zone, as is the case in certain prior devices. The entire travel of said cups is confined in the annular freezing chamber. The only moving parts associated with the cups whose operation might normally be affected by freezing in the sub-normal temperature are the pivot elements 25. The needle pivots are so constructed that they reduce resistance to movement when frosted and, in addition, the enclosed freezing chamber minimizes frost deposition, as stated. Operation of the apparatus is automatic once the motor circuit thereof is closed and it will automatically discharge an ice cube each time a cycle is initiated.

It is believed that the operation of the apparatus can be understood from the foregoing description; however, it may be recapitulated in a general way as follows: Completion of the motor circuit results in 180 degree rotation of the driving and control shaft 34 and 360 degree rotation of the eccentric and timer shaft 35. These shafts automatically come to rest at the end of their rotation upon disconnection of the motor circuit by circuit breaker cam 130 on the last named shaft. Assuming that a pair of filled and frozen cups 31 are present at the discharge station D in the normal, downwardly depending position in which they traverse the major portion of the freezing chamber 15, the first operation of a cycle following initiation of actuation of shafts 34 and 35 is that of inverting the cups 180°, which operation is performed through the rotation of the cog teeth 46' on the cup holder 27 by the coacting cog wheel 48. The timing of this operation is controlled by means of the segmented gears 38, 39 and disk 37, so that the holder 27 comes to rest after 180 degree rotation.

Discharge of a cube is performed by the inner plunger device 63, the spring weighted oscillatory arm 76 which is associated with said device being permitted to travel downwardly by its cam 84 and thereby thrust the associated plunger tip 70 against the inverted cup in the manner shown in Fig. 8. The cup is accordingly discharged and falls onto the discharge trough 111 and through the port 113 which has been automatically opened by the cable actuated control of its closure flap 115. This completes one cycle of operation and the motor comes to rest. During said cycle a set of cups 30 on the immediately preceding spider arm 25 has been filled by the liquid lines 134 and 135 under the control of the automatically acting valve 136 so that such valve is shut off approximately at the end of the first cycle.

The next cycle of operations is performed upon the other cup in the holder at the discharge station D, the operation of discharging being performed by the other plunger device 64, in the same manner as device 63 was actuated. The actuation of the plungers by the eccentric linkages is such that a long, even and continuous stroke thereof is assured to eject the ice cube without damaging the cup. Likewise, the shape of the plunger tips 70 insures unfailing stripping of the frozen cubes from the inverted cups.

Following restoration of the device 64 to its upper position, the segmented gears 38, 39 controlling bevel pinion 36 come into play, followed by indexing of the spider ring 17 and connected arms 25 as a final operation of the second cycle which brings the next succeeding spider arms and its connected cup holder into position at the discharge station for a repetition of the two cycles which have been described.

It is therefore seen that the operation consists of repetitions of two cube discharge cycles each having two phases or steps insofar as the discharge of cubes is concerned, the four successive steps in the associated cycles being as follows: (1) 180 degree inversion of cups at the discharge station and locking of the same in angularly fixed position; (2) discharge of a cube from one cup and return of discharge plunger to inoperative position; (3) discharge of the other cube from its cup and return of the corresponding discharge plunger to inoperative position; and (4) indexing of the spider and cup holders thereon to position a succeeding holder at the discharge station. Operation is terminated at the end of each of steps (2) and (4) by the automatic interruption of the motor circuit. Filling of the cups at the filling station may, of course, be performed at any time within the period covered by the above four associated steps.

I am aware that those skilled in the art will perceive the possibility of making various alterations or refinements in one or several of the features hereinabove described, without departing from the principles involved in the invention. I therefore desire that the invention be construed in no more limited sense than is reasonably indicated by the appended claims.

I claim:

1. A dispensing apparatus of the type described, comprising a plurality of flexible and reversible receptacles adapted to be filled with material to be frozen, means for transporting said receptacles in an endless circular path past a discharge station, means for bodily rotating a filled receptacle 180° about an axis other than the axis of said circular path, whereby to place said receptacle in inverted position, and means for discharging frozen contents from said inverted receptacle at said discharge station by flexing and reversing the surfaces of said receptacle.

2. A dispensing apparatus of the type described, comprising a plurality of flexible and reversible receptacles adapted to be filled with material to be frozen, means for transporting said receptacles in an endless circular path past a discharge station, means defining a freezing chamber enclosing said entire path and station, means for bodily rotating a filled receptacle 180° about an axis other than the axis of said circular path, whereby to place said receptacle in inverted position, and means for discharging frozen contents from said inverted receptacle at said discharge station by flexing and reversing the surfaces of said receptacles, comprising a device guided externally of said freezing chamber, and means for imparting discharge and return movements to said device from the exterior of the chamber.

3. In a dispensing apparatus of the type described, a flexible and reversible, open-ended, commodity-receiving receptacle which is similar in initial surface shape regardless of which surface thereof is internally exposed by reversal, a freezing chamber through which said receptacle is transported, means in said chamber to discharge a commodity from the receptacle by reversing the same, whereby the open end thereof faces in one direction, and means to bodily rotate said receptacle 180° to dispose said open end to face in the opposite direction.

4. In a dispensing apparatus of the type described, a flexible and reversible, open-ended, commodity-receiving receptacle which is similar in internal surface shape regardless of which surface thereof is internally exposed by reversal, a freezing chamber through which said receptacle is transported, means to invert said receptacle, and means in said chamber to discharge a commodity from the inverted receptacle by reversing the same.

5. In a dispensing apparatus of the type described, a pair of flexible and reversible, open-ended, commodity-receiving receptacles each similar in internal surface shape regardless of which surface thereof is internally exposed by reversal, a freezing chamber through which said receptacle is transported, a holder for said pair, means to invert said holder and receptacles, and means in said chamber to discharge a commodity from an inverted receptacle of said pair by reversing said last named receptacle and stripping the commodity therefrom.

6. In a dispensing apparatus of the type described, a pair of flexible and reversible, open-ended, commodity-receiving receptacles each similar in internal surface shape regardless of which surface thereof is internally exposed by reversal, a freezing chamber through which said receptacle is transported, a holder for said pair, means to invert said holder and receptacles, and means in said chamber to discharge a commodity from an inverted receptacle of said pair by reversing said last named receptacle and stripping the commodity therefrom, the receptacles of each pair being normally disposed to open in the same direction relative to said holder while transversing said chamber.

7. A dispensing apparatus comprising a conveyor having sets of at least two receptacles thereon and adapted to transport said sets through an endless path, means for periodically rotating said sets on said conveyor through 180° in an angular direction relative to said path to invert said receptacles, and means for discharging the contents of the inverted receptacles, comprising a plunger aligned with each receptacle of the set and movable into discharging engagement therewith, members operatively connected to the respective plungers to actuate the same, means to restore the plungers to non-discharging position following discharge movement thereof, and means successively engageable with said actuating members to maintain one of the plungers in non-discharging position during discharging movement of another.

References Cited in the file of this patent

UNITED STATES PATENTS

| Number | Name | Date |
|---|---|---|
| 425,221 | Harden | Apr. 8, 1890 |
| 1,960,456 | Robb | May 29, 1934 |
| 2,058,077 | Greenwald | Oct. 20, 1936 |
| 2,092,773 | Nordquist et al. | Sept. 14, 1937 |
| 2,244,826 | Cox | June 10, 1941 |
| 2,252,913 | Baer | Aug. 19, 1941 |
| 2,262,590 | Phelan | Nov. 11, 1941 |
| 2,342,743 | Lutes | Feb. 29, 1944 |
| 2,381,068 | Lutes | Aug. 7, 1945 |
| 2,431,916 | Caesar | Dec. 2, 1947 |
| 2,441,833 | Morrison | May 18, 1948 |
| 2,466,831 | Van Vleck | Apr. 12, 1949 |
| 2,478,312 | Peltier | Aug. 9, 1949 |
| 2,510,400 | Hurley | June 6, 1950 |
| 2,511,851 | Iwashita | June 20, 1950 |
| 2,522,651 | Van Vleck | Sept. 19, 1950 |